Figure 1:
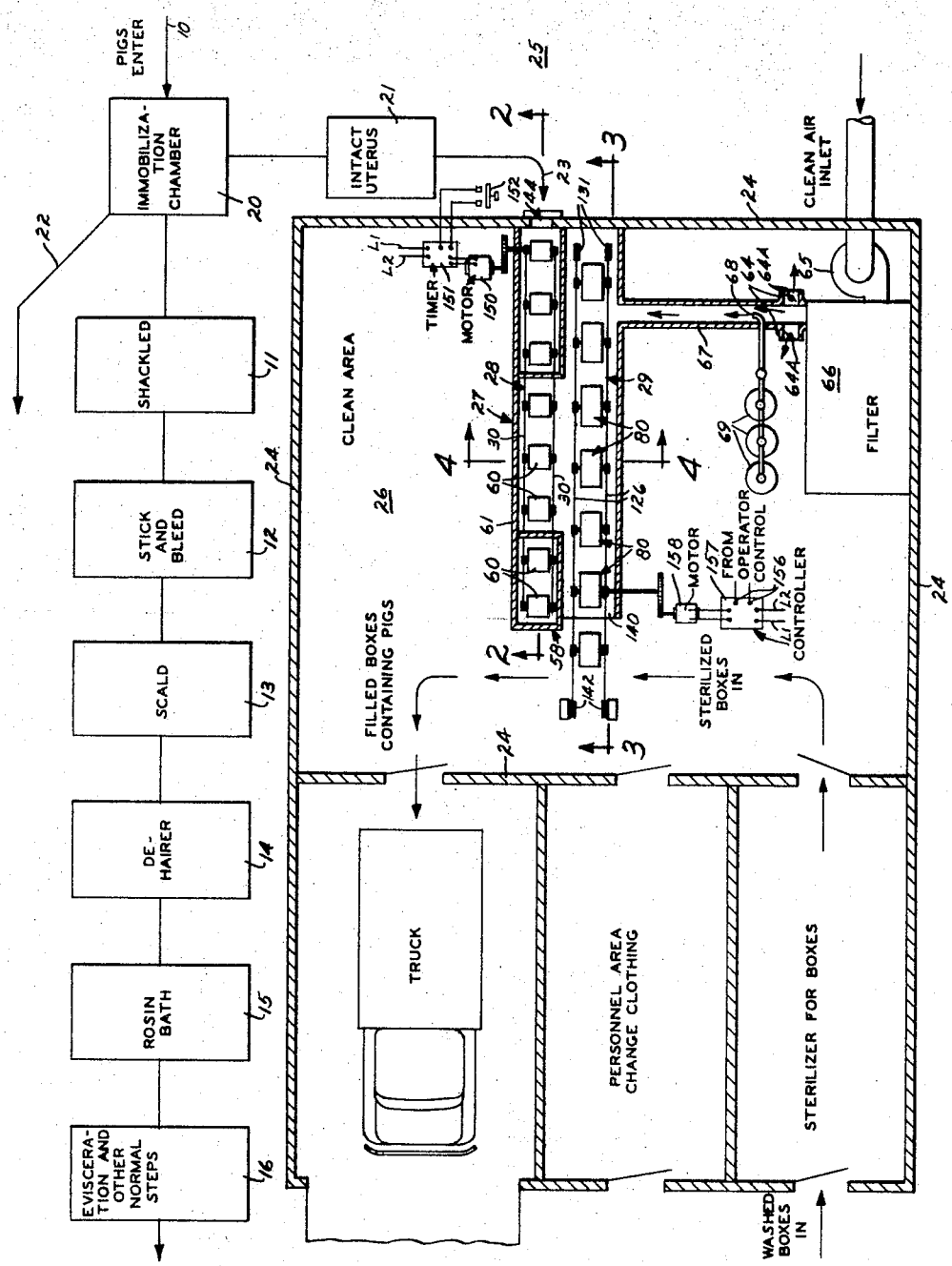

March 8, 1955     G. A. YOUNG, JR     2,703,570
APPARATUS FOR PRODUCTION OF QUADRUPED MAMMALS
Filed June 12, 1952     5 Sheets-Sheet 1

INVENTOR
GEORGE A. YOUNG JR.
BY
ATTORNEYS

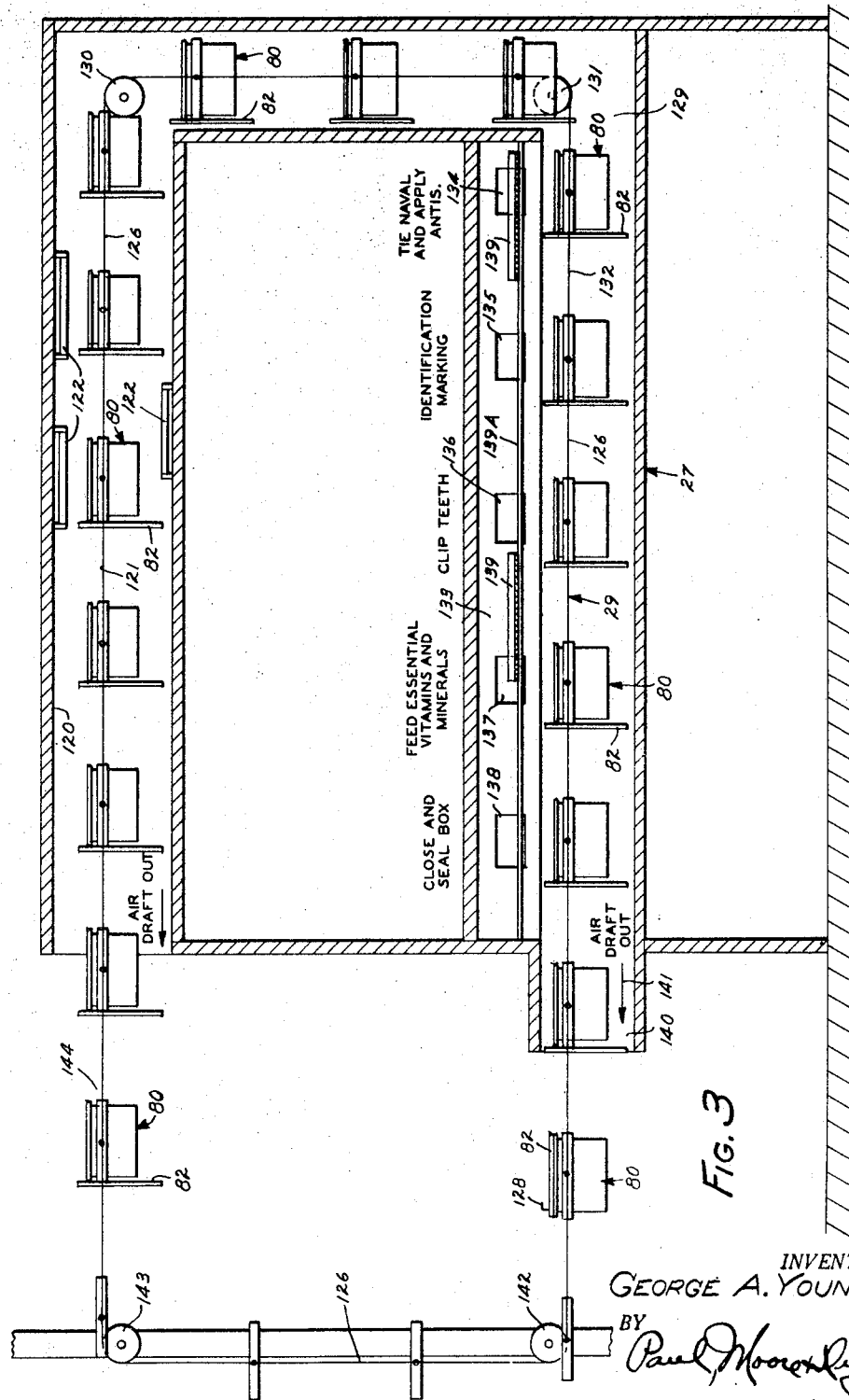

March 8, 1955  G. A. YOUNG, JR  2,703,570
APPARATUS FOR PRODUCTION OF QUADRUPED MAMMALS
Filed June 12, 1952  5 Sheets-Sheet 4
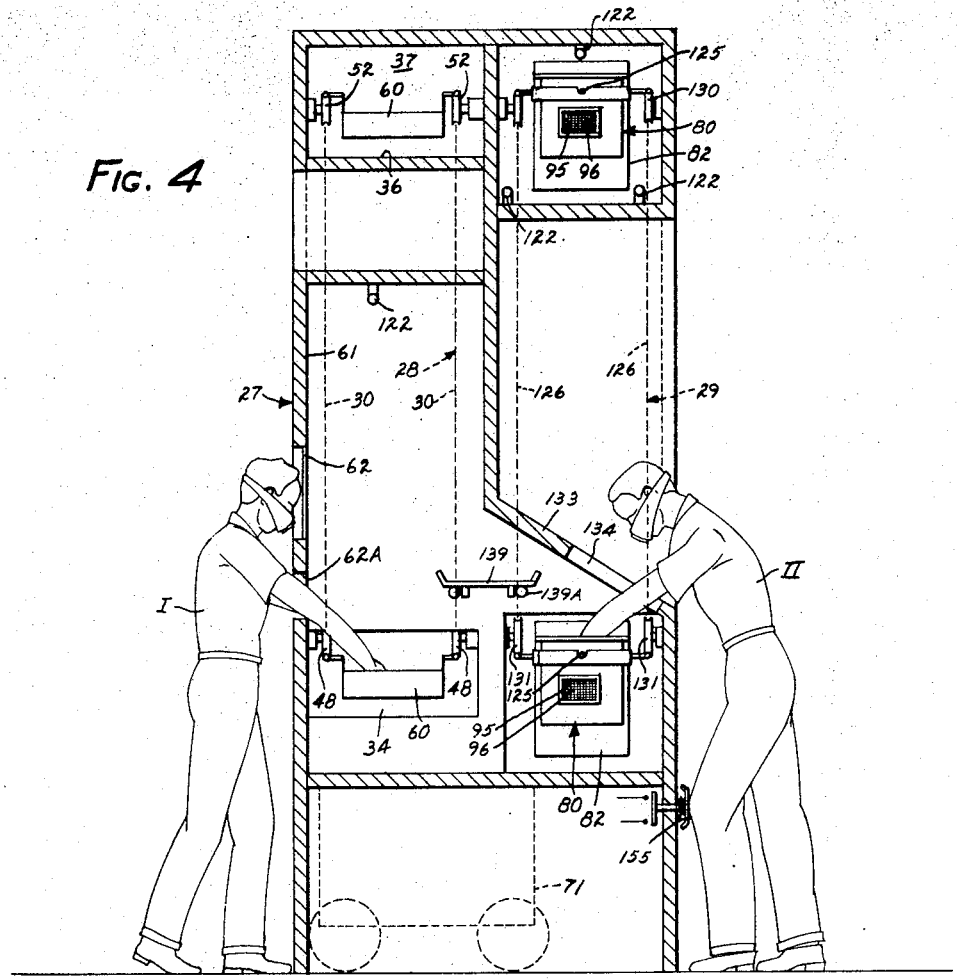
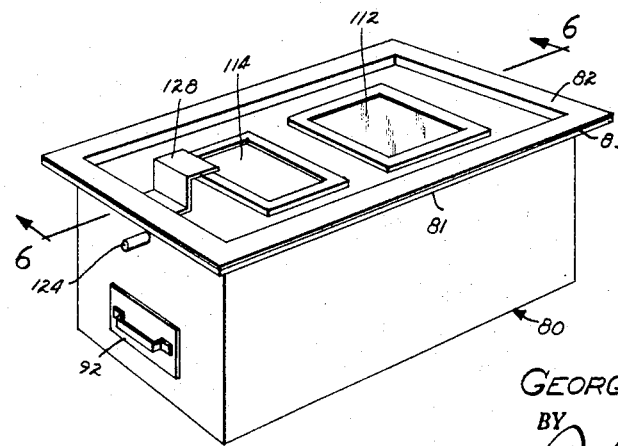
INVENTOR.
GEORGE A. YOUNG JR.
BY
ATTORNEYS March 8, 1955      G. A. YOUNG, JR      2,703,570
APPARATUS FOR PRODUCTION OF QUADRUPED MAMMALS
Filed June 12, 1952      5 Sheets-Sheet 5
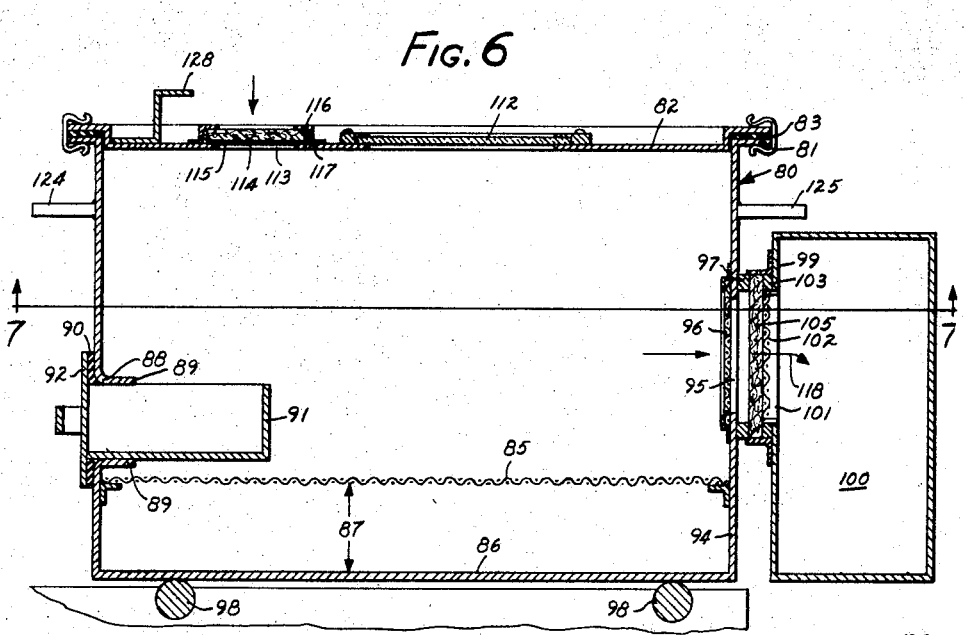
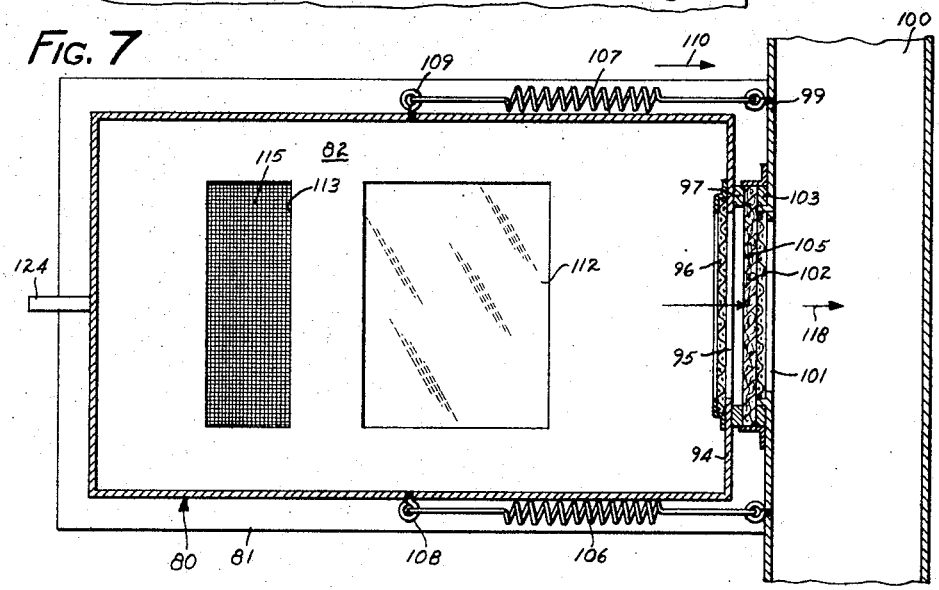
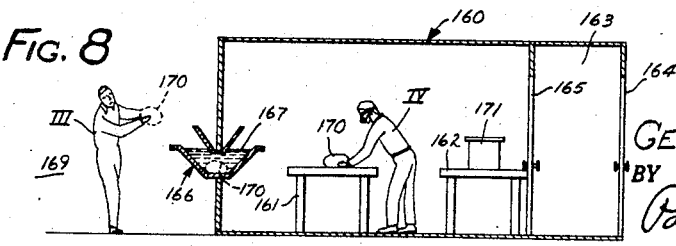
INVENTOR.
GEORGE A. YOUNG JR
BY
Paul Moorehugger
ATTORNEYS

United States Patent Office 2,703,570
Patented Mar. 8, 1955

2,703,570

APPARATUS FOR PRODUCTION OF QUADRUPED MAMMALS

George A. Young, Jr., Austin, Minn., assignor to Regents of the University of Minnesota, Minneapolis, Minn., a corporation of Minnesota Application June 12, 1952, Serial No. 293,094

9 Claims. (Cl. 128—1)

This invention is concerned with the production of feeder mammals, such as pigs, sheep, cattle, fur-bearing animals etc. For convenience only, reference is most frequently made herein to the production of feeder pigs, but the invention is understood not to be so limited. According to the traditional methods of swine production the farmer has maintained brood sows which are bred at regular intervals so as to produce litters of pigs at appropriate times for best marketing. In the regular farming method the sows give birth to the pigs under natural conditions. Under modern farming conditions farrowing houses are provided in an attempt to decrease the rate of mortality among the little pigs. Other improvements of detailed nature have been made from time to time, such as the provision of added heat in the farrowing houses, the provision of various stall formations so as to prevent the sows from rolling or stepping on their little pigs, provision of heated floors, special litter, heat lamps, etc; all with the object of minimizing disease, decreasing death by accident among the little pigs and producing swine with best economy. Even with these improvements that have been made throughout the years of agricultural pursuits, the method differs little from that of centuries ago, in that the chain of communication of swine diseases is unbroken from sow to little pigs, with the result that the diseases of the elder are communicated to the offspring. In this respect swine production is different from the production of poultry wherein incubation has almost entirely replaced the hatching of eggs by the mother hen, and the chain of disease communication from mature chicken to chick is broken, or at least vastly impeded, for each generation.

More recently it has been proposed to have "pig hatcheries" but all of these schemes have utilized the brood sow as the basis of production of the little pigs and the improvements, where proposed, have only been to the end of reducing mortality by use of various good practices and equipment during farrowing and brooding.

It is an object of this invention to provide a method and apparatus for producing healthy feeder mammals, such as swine, sheep, cattle, fur-bearing animals, etc. which may be sold to the farmers or growers ready to be put out into the feed lots or cages and fed to maturity for the production of meat, hides, furs, etc.

It is a further object of the invention to provide a method and apparatus of producing feeder pigs wherein the pigs which are developed to maturity or nearly to maturity in the uterus of the sow are removed in the packing plant by an operation, which in human beings would be known as a hysterectomy.

It is a further object of the invention to provide a method and apparatus for producing feeder pigs wherein the feeder pigs are removed from the sow by an operation analogous to a hysterectomy accompanied by Caesarean section and then the little pigs fed for a period of time under clean and controlled conditions until they gain strength sufficient to withstand farm conditions.

It is a further object of the invention to provide apparatus wherein the foregoing methods may be carried out expeditiously with a minimum of labor with minimized contamination of the little pigs.

It is another object of the invention to provide improved methods and apparatus whereby pigs removed by an operation analogous to a hysterectomy from the gravid uterus of a mature sow are individually handled and prepared under conditions of controlled sanitation for the first few weeks of their life.

It is another object of the invention to provide method and apparatus whereby the pigs removed from the brood sow by an operation analogous to a hysterectomy are maintained separately or in small groups under conditions of controlled sanitation and fed for a sufficient period of time until they have developed strong enough to be thereafter readily adapted to farm conditions.

Other and further objects of the invention are those inherent in the methods and apparatus herein illustrated, described and claimed.

Figure 2:
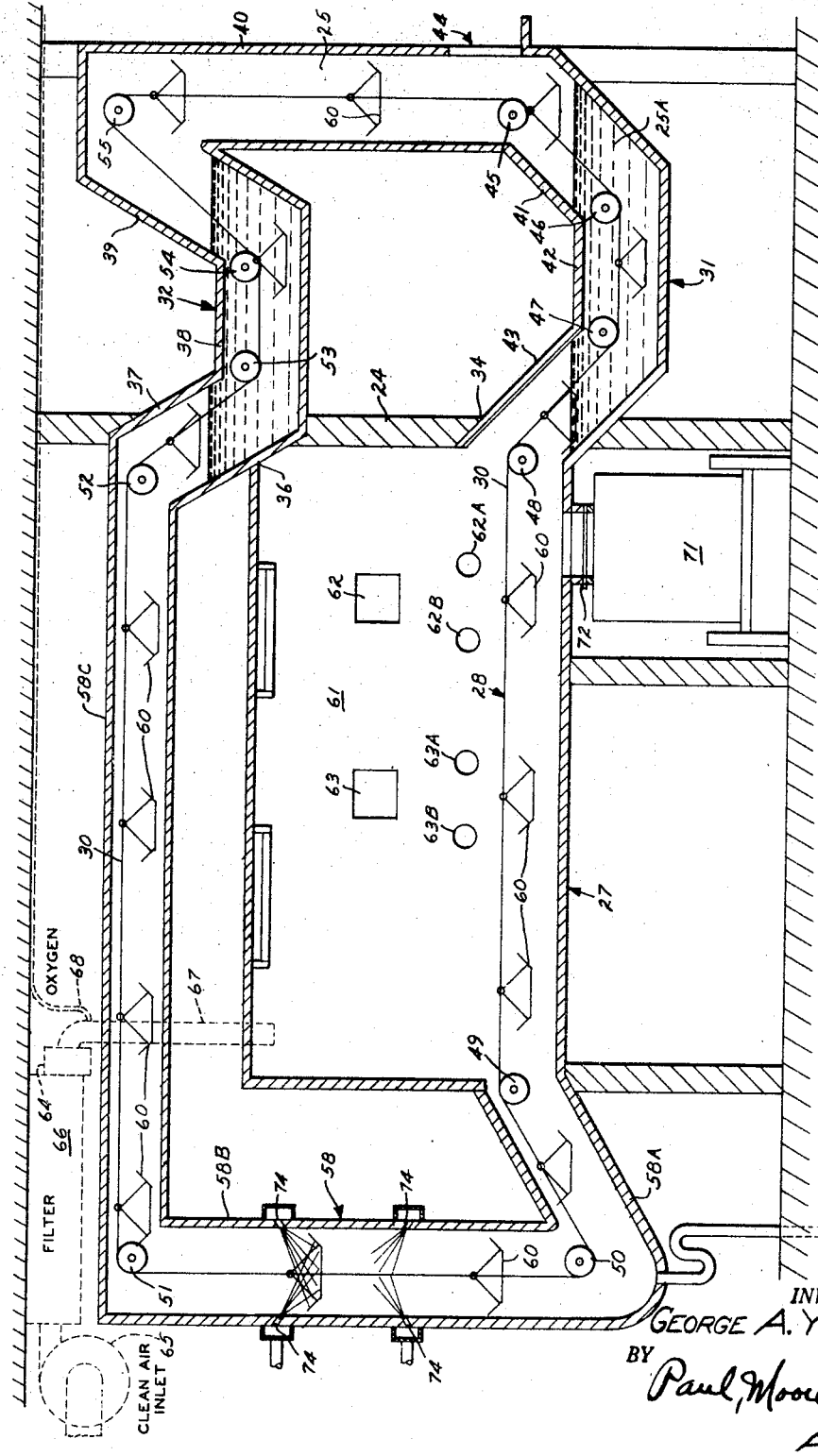

The invention is illustrated with reference to the drawings in which corresponding numerals refer to the same parts and in which Figure 1 is a flow sheet and also a plan view of portions of the apparatus of the invention which is used in carrying out the method of the invention;

Figure 2 is a vertical sectional view of the conveyor and other apparatus for carrying the intact gravid uteruses of sows from the unclean abattoir killing room area to a clean area wherein the intact uteruses of the sows are opened and the little pigs manipulated and transferred. Figure 2 is taken along the line and in the direction of arrows 2—2 of Figure 1;

Figure 3 is a vertical sectional view through a portion of the clean area of the apparatus illustrating a conveyor system of the process and apparatus wherein the little pigs are carried along, and while being so carried are given the necessary preliminary operations and manipulations requisite to their development, growth and identification. Figure 3 is taken along the lines and in the direction of the arrows 3—3 of Figure 1;

Figure 4 is a fragmentary vertical sectional view at one of the stages along the treating conveyor, this view being taken along the line and in the direction of arrows 4—4 of Figure 1;

Figures 5, 6 and 7 illustrate individual isolation units for containing the little pigs, Figure 5 being an isometric view of one of the isolation units with the lid in place; Figure 6 being a longitudinal vertical sectional view taken along the longtudinal midplane of the unit and the exemplary rack and wall against which it is placed; and Figure 7 being a horizontal sectional view of the unit set against the wall and with the lid in place;

Figure 8 illustrates a modified unit for carrying out the method of the present invention, being shown in section.

In the normal abattoir devoted to the production of pork, lard and pork products, the pigs are handled along a line wherein individual operations are carried out in sequence. In the killing, dehairing, scalding and related operational areas, a certain amount of uncleanliness is inevitable since the live animals, as brought to the abattoir, come straight from the farm and are dirty and may be contaminated with diseases characteristic of swine. A part of the usual abattoir line is illustrated in Figure 1, and the method and apparatus of the present invention must be considered as being adaptable to installation and use as an improvement in abattoir practice. Thus, in the usual packing house the live animals are brought in at 10 and in many of the packing houses they are shackled at 11, that is to say drawn up by one or both rear legs. They are then stuck with a long knife at 12 and bled, and after expiring, the conveyor system which carries the pig along after being shackled, carries the carcass to a scalding tank 13. The conveyor then carries the pig to a dehairing area 14 where most of the hair is removed by scraping or otherwise, and the thus cleaned carcass is then carried to a rosin bath 15, and after removal of the rosin layer the carcasses are clean and ready for the evisceration and cutting steps 16 of the usual process.

This usual method of packing house practice has been somewhat improved in recent years by the addition of an immobilizing technique at 20, which is based upon the idea of anesthetizing the animal. While any number of anesthetizing materials may be used, a preferred anesthetizing gas is carbon dioxide since it leaves no undesirable or toxic residues in the animal. According to the present invention such immobilizing chamber is used at 20 and the incoming pigs, including the brood sows large with litter, are anesthetized at 20 and thereby immobilized. At this point a workman operating upon the brood sow performs an operation which in the human being would be known as a hysterectomy. The intact gravid uterus of the sow is removed and contains the developed small pigs. The gravid uterus thus being removed from the sow in an unclean area is susceptible to contamination of its external surface and such intact uterus at 21 may therefore be assumed to be moderately contaminated throughout all or part of its external surface after removal from the sow. The sow being thus operated upon is removed from the regular production line at 22 and is separately handled for removing the hair, scalding, etc. Such brood sows from which the intact uterus is removed may be skinned and the skin and hair discarded or used for fertilizer, the remainder of the carcass being processed, in accordance with law, so that the meat and fat factors may be recovered for commercial purposes.

For purposes of this invention it is preferred that the sows used be at an appropriate stage of gestation, preferably at or near full term. The removal of the intact gravid uterus is a simple operation requiring only a few seconds' time, and these intact uteruses are then transferred immediately to baskets of a conveyor system at 23. This conveyor system is best illustrated in Figures 1 and 2. Referring to Figure 1, within the rectangular area bounded by the walls 24—24, conditions of relatively great cleanliness may be maintained. The walls 24—24 completely enclose a space in or adjacent to the abattoir area 25 which itself is comparatively unclean. By making the enclosure 24—24 tight and sound, the entire space within it at 26 may be maintained at cleanliness levels equivalent to those found in the best hospitals. Provision is made so that personnel entering and leaving area 26 enter or leave there through anterooms or locks where their street or usual clothing may be taken off and sanitary uniforms put on for work within the clean area 26 or vice versa. It goes without saying that personnel entering the area 26 would preserve a requisite degree of personal cleanliness, such as is required in hospital areas.

Within the area 26 there is a further enclosure generally designated 27 which may be designated the transfer and work chamber. Into this chamber 27 there enter and leave two conveyor systems, the first being generally designated 28 (shown in section in Figure 2) and the second generally designated 29 (shown in section in Figure 3). The conveyor system at 28 (illustrated in Figure 2) consists of a conveyor chain or chains 30 which has a closed path of travel extending from the unclean abattoir area 25 through a pair of sterilizing locks 31—32 and into the clean area within the chamber 27. Thus, referring to Figure 2 the wall 24, which in part forms the clean area 27, also separates the unclean abattoir area 25 from the interior of the work and transfer chamber 27. A liquid or air lock 31 is connected to the port hole 34 in this wall 24 and a second lock is connected to the port hole 36.

The lock 32 is preferably constructed in the form of a downwardly extending conduit 37 which passes through port 36 in wall 24 and is sealed to the wall. The slanting conduit 37 then connects to a horizontal pass at 38 which in turn connects to an upwardly extending conduit 39 which then connects to a further vertical conduit portion 40 that connects to the downwardly extending portion 41 of the lower lock 31. This downwardly extending portion 41 then connects with a horizontal pass at 42 and the latter connects through the upwardly extending run at 43 which passes through and is sealed to the port hole 34 of wall 24. A window at 44 is provided in the conduit portion 40. A conveyor runs in the aforesaid conduits and includes a suitable number of guide pulleys 45—55 which are provided so as to guide the conveyor chain or chains 30 within the aforementioned conduits along a course of travel. Thus the conveyor travels downwardly through the conduit 40, thence past window 44 and around guide pulley 45 and thence through lock 31, as determined by guide pulleys 46, 47 and 48. The conveyor, after coming up out of lock 31 then travels horizontally through the work and transfer chamber 27, thence through a return conduit generally designated 58. This involves a pass downwardly through conduit portion 58A, conveyor guide rollers 49 and 50, thence upwardly through 58B, around guide roller 51, along the horizontal run 58C and then lock 32, conveyor guide rollers 52, 53, 54 and 55, returning to the top of conduit run 40. The conduit is closed, except at window 44 and where it opens into the interior of chamber 27.

The conveyor chain or chains 30 carry a plurality of baskets 60 of perforated material and the operator performing the hysterectomies in the contaminated abattoir area removes the intact gravid uteruses and places them, one by one, in the baskets 60 passing by opening 44 in the conduit 40. The intact uteruses are thence carried by the conveyor downwardly through the lock 31 which not only seals the conduit at this place but may contain an antiseptic, such as a dilute solution of chlorine or other suitable antiseptic in order to render sterile the conveyor and its contents. Thus, as the conveyor passes the baskets successively through lock 31, the entire conveyor, chains, baskets and the uteruses in the baskets are passed through the antiseptic, which then drains off as the conveyor moves into the interior of chamber 27. In this way the exterior surfaces of the intact gravid uteruses are rendered reasonably aseptic. As the conveyor carries the baskets containing intact uteruses through the chamber 27, the uteruses are opened by operators standing outside the chamber and working through hand holes along the sides, their work being observed through suitable windows. Thus, along the wall 61 of the chamber 27 there may be provided a plurality of window openings 62 and 63 and alongside of each one of them are a pair of hand holes 62A, 62B, 63A and 63B. The chamber 27 is maintained under slight positive pressure by means of a blower 65 which has an air inlet from the clean exterior area. The blower blows the air through a filter at 66 for the removal of entrained contaminating bacteria, and the thus filtered air is conducted through the conduit 67 into the chamber 27. Some of the filtered air may be by-passed to room 26 by outlets 64 equipped with valves 64A. Extra oxygen may be introduced into the filter air at 68 from the oxygen supply 69 so as to maintain a slightly higher oxygen content within the chamber 27 than in normal atmosphere.

The personnel working at the chamber 27 through handholes 62A, 62B or 63A, 63B open the uterus and remove the still live small pigs from it and transfer the pigs into their individual boxes carried by conveyor 29 as will be more fully described. Any of the hand holes 62A—62B and 63A and 63B, which are not in use are plugged or covered so as to minimize the amount of exterior area of the chamber 27 opened to the area 26 which is likewise maintained under conditions of hospital cleanliness. The workers performing this operation through the hand holes 62A—62B etc. may work with rubber gloves, gauze gloves or by suitably cleansing their hands before beginning their work and at intervals while working, as necessary. In these ways, the degree of contamination due to their work is sufficiently minimized for satisfactory results.

After the pigs are removed from each of the uteruses, the uteruses and placentae are dropped into a container 71 which is fastened with a reasonably air-tight connection at 72 to the bottom of the work and transfer chamber 27. From time to time the chamber 71 is removed and a fresh receptacle placed there. The thus emptied baskets 60 on the conveyor return along the path of travel of the conveyor, which it will be noted is slightly downward in the portion 58A of the return conduit. In the portion 58B of the return conduit the baskets and the conveyor are sprayed off by the power washing sprays 74—74 and the thus cleaned conveyor and baskets 60 return and pass through the horizontal run 58C and thence through lock 32 in which scalding water is maintained by a suitable float valve. This serves to sterilize the conveyor chains and each of the baskets 60 before they return to the window opening 44, thus minimizing the transfer of contaminated material from one uterus to the next.

Referring now to Figures 5, 6 and 7, according to this invention each of the little pigs that is thus removed from the uterus of its mother sow is alive and it is placed in an individual growing box which is sealed and provided with sterilized air. The growing box likewise is provided with a pan from which the pig gets its nourishment and the little pig lives on a wire grid throughout the first week or ten days of its life. An exemplary form of growing box is shown in Figures 5, 6 and 7. Thus, for purposes of little pigs the growing box may be of dimensions 14 inches high, 14 inches wide and 22 inches long, although different szes may be used if desired. The box which is generally designated 80 has a top flange at 81 and is adapted to receive a lid 82 having a gasket 83, the entire lid and box being provided with suitable clamps for holding the lid tightly on top of the box once it is in place. Within the box there is a wire floor 85 raised sufficiently from the base 86 of the box so as to provide a space indicated by the dimension 87 into which the urine and fecal waste of the small pig drop during the first week or ten days of its life. On the front of the box there is a opening at 88 having an inwardly turned supporting flange 89 all around. Around the opening there is a gasket 90. Into the opening against the gasket is slid a feed pan 91 having outer end wall 92 which seals against the gasket. Here again there may be provided clips for holding the pan firmly in place against the gasket. The growing box is provided with an air inlet and outlet and is maintained under slight negative pressure during use. In the preferred form of growing box the back wall 94 is provided with an opening 95 having a screen 96 across it and having a stiffening flange 97 all around. The box during the growing period of the pig is placed on a suitable framework or rack 98 of galvanized pipe or the like in a warm and reasonably clean room. The box is pushed firmly against a wall 99 of an exhaust conduit 100 in which a slight negative pressure is maintained by a suitable exhaust fan. At intervals along the conduit wall there are openings 101 across each of which is provided a screen 102. A stiffening flange is provided at 103 around the screened opening. Before the growing box is placed on the rack 98, a filter pad 105 of cotton, glass wool or cellulosic material is placed against the screen 102 and the whole box 80 is then pushed against the conduit until the flange 97 pushes against the flange 103, thus sealing with reasonable security the rear portion of the box against the opening 101 of the conduit 100 and holding the filter in place. It is usually best to provide springs 106 and 107 at opposite sides of the box having coupling latches at the front and that may be hooked over eyes 108—109 on opposite side walls of the box so as to provide a backwardly pulling force in the direction of arrow 110, thus providing requisite pressure between the flanges 97 and 103 for holding the filter pad firmly in place.

On top of the box there is a glass or plastic window 112 through which observation of the little pig may be made at intervals and at another place on the top of the box there is provided a screened opening at 113 over which a pad 114 of cotton, glass wool or cellulosic filter material may be placed, the pad being held in place on screen 115 by a slip on rim 116 which slips onto the upstanding flange 117 around the opening 113. Thus, the filter is likewise held in place and when a negative pressure is maintained within the box 80, air from within the growing room is gently drawn through the filter and distributed in a draftless manner within the growing box. It may be pointed out that the air leaving the box through the opening 95 passes in the direction of arrow 118 into the conduit 100 and it might be supposed that the filter 105 could therefore be dispensed with. However, the filter 105 does serve a purpose, since should contamination enter into the exhaust system, it will be kept from creeping through the connection and into the growing box. For each batch of little pigs that is produced, it is preferable to sterilize the exhaust system 100 by an appropriate sterilizing gas, such as formaldehyde or the like and at the same time the entire growing house in which the boxes 80 are racked during the growing period should likewise be thoroughly cleaned and sterilized by known procedures before being returned for refilling.

The way that the little pigs are placed in the growing boxes 80 and are given their introduction into their growing life is best illustrated with reference to Figure 3 which is a vertical sectional view through the work and transfer housing 27 and conveyor 29. This figure shows the conveyor generally designated 29 which is designed to carry the clean and sterilized boxes 80 from the clean area 26 into the work chamber 27 and after the pigs have been placed in them and the boxes are closed again and are carried out of the chamber 27. For this purpose the conveyor system includes the following:

The conveyor is a closed system and enters the work chamber 27 through a conduit 120 where the conveyor moves along a horizontal course of travel 121 and carries the boxes 80—80 in an area of intense ultra-violet light furnished by the ultra-violet lamps 122—122. Each of the boxes is provided with a pair of aligned trunnion pins 124 on the front of the box and 125 on the back of the box, each of which are above a median longitudinal plane through the box. By means of these pins the boxes may be placed on suitable hangers on a pair of spaced parallel running conveyor chains 126 forming the conveyor. The chains have hangers or rings for receiving the boxes. In addition, each of the covers 82 of the box has an upwardly bent hook at 128 and the cover of the box is hooked over the flange 81 so that the cover is carried along with the box as it is moved by the conveyor. As will be explained, the boxes and covers are thoroughly cleaned and when they are brought back to the area 27, they are sterilized in a batch operation sterilizer, by steam or other sterilizing agent before they are loaded on the conveyor and are then additionally passed through the ultra-violet light at 122—122. The conveyor then passes over the rollers 130 of the conveyor, and then downwardly and after passing around the rollers 131 moves through opening 129 into chamber 27 and thence along a horizontal course of travel at 132 within the chamber 27. This course of travel is beneath a slanting wall 133 of the chamber 27 which is provided with five or more access openings 134, 135, 136, 137 and 138. These access openings are sufficiently large so that an operator at each of them may perform certain work operations through the opening, but contamination is minimized due to the fact that the slight positive pressure within the house 27 causes an outflow of air. In addition, each of the operators wears a mask and maintains his or her person in a condition of strict cleanliness.

At the access opening 134 the navel of the little pig is tied off and treated with antiseptic. It may be explained that the operator I at the window 62 at the opposite side of chamber 27 as he removes the pigs from the gravid uteruses hands them one at a time to operator II who places the little pigs in the boxes 80—80 that are being carried by conveyor 29 parallel to the conveyor 28 at which he is working. If needed, the pigs may be placed in the holding tray 139 which can be skidded along rails 139A for the convenience of the operator. When the little pigs are placed in their individual boxes, they are then made ready. Each pig has its navel tied and treated with antiseptic at window 134. Then as the conveyor 29 carries the boxes 80 along at the next station 135, an attendant notches the ear of the little pig with suitable identification marking, or otherwise identifies the pig as by indelible tagging. Similarly, at the window 136 a workman breaks off the sharp pointed eye tooth of the little pig. The sharp teeth would do no harm during the first part of the growing operation of the pig, but later when the little pigs are brought together in groups for community living they would indulge in a certain amount of injury to each other were not the sharp pointed eye teeth clipped.

At the station opposite the window 137 another operator gives the little pig his first feeding of essential vitamins and minerals and at the station opposite the window 138 another operator takes the lid 82 off the box which has been hung by the hook 128 on the flange 81 and puts it in position on the top of the box and pulls down the suitable clamps for holding the box lid tight. The filter 114 has previously been placed onto the lid and the back opening 95 of the box during this course of travel is covered by a removable cover which is temporarily fastened in place. The conveyor 29, continuing its horizontal course of travel, then leaves the chamber 27 through a port 140 through which there is a gentle outflow of air at 141 due to the slight positive pressures within the chamber. At the exterior of the chamber 27 other workmen within the clean area 26 remove the pig-filled boxes 80 into a waiting rack or trucks by which they are loaded into clean trucks and transported to growing houses which may be at remote locations several miles away from the packing plant. The conveyor 29 then travels over the roller 142 and thence back over roller 143 to the loading station at 144 where the boxes and lids, previously steam sterilized in the batch operation, are loaded onto the conveyor.

While the method of the invention is particularly adaptable for the production of feeder pigs, it will be understood that it is equally adaptable for other meat or fur animals which are brought to maturity in the uterus (womb) of a mother animal. Thus, sheep, goats, calves, mink, foxes and the like may be handled in a similar manner.

Likewise, in illustrating the method and apparatus of the instant invention straight line conveyors have been shown but it will be understood that other forms of conveyors may be used, such as circular table conveyors, or the like, and that other forms of antiseptic locks, other than those illustrated, may be utilized, although the illustrated form is preferred.

A suitable operator controlled drive is provided for each conveyor. For conveyor 28 it is preferred that the drive be under control of the operator who works in the exterior area 25 in order that he may start the conveyor and cause it to run for at least a sufficient time to bring a basket in which an intact gravid uterus has been placed at window 44 through the antiseptic at 25A in lock 31 and as far as station 62 of the chamber 27. The conveyor may then shut off unless the operator has in the meantime filled subsequent baskets 60 with additional gravid uteruses. The controls used for such operation could be of standard type and include a motor 150, connected to drive conveyor 28, a timer 151 and an operator push button 152 adjacent opening 45. When button 152 is pushed, the conveyor 28 operates for a given period of time after each actuation of push button 152 by the operator in the exterior area 25, thus insuring that each gravid uterus is promptly carried through the trap 31 and the antiseptic solution 25A therein and into the chamber 27. The conveyor then stops with the gravid uterus within the interior of cabinet 27 adjacent stations 62 or 63 until a further gravid uterus is removed by the operator in the area 25 and again placed in succeeding baskets of the conveyor and brought into the chamber 27. If desired, the controller 151 may be made responsive to the distance traveled by the conveyor instead of time, as is well known in the control art, and an interlocking control provided adjacent stations 62 and 63 so that conveyor 28 can not be started by pushing button 152 without a corresponding actuation by operator at station 62.

The conveyor 29 is likewise made under control of the operator or operators stationed opposite the windows 134—138. Thus, a convenient hand or knee-operated control 155, Figure 4, may be provided on the exterior of the cabinet 27 so as to allow control of movement of the conveyor 29 so long as is necessary for progressively bringing additional containers 80—80 along in front of the various work stations 134—138. Control 155 is connected to terminals 156 on a motor control cabinet 157, which controls motor 158 connected by gears to conveyor 29. The holding tray 139 within cabinet 27 permits a certain holding time in the event there is inequality of timing between the operators working at windows 62—63 (viz. operators I) and the operators working at stations 134—138 (viz. operators II). The timing of the operation is made comparatively rapid, at least so far as concerns the time involved from the instant the gravid uterus is removed from the mother animal until it has been passed through the lock 31 and brought into chamber 27 and opened and the live small animals, for example pigs, are brought out and placed on tray 139 or in the boxes 80—80. The entire cycle does not take more than a few minutes, frequently a minute or less goes by from the time that the gravid uterus is removed from the sow and passed through the lock 31 into chamber 27, opened, and the live small animals taken out and placed in the boxes 80—80 or on the tray 139. Once the animals are in the boxes 80 or on the tray 139, additional waiting time is of no serious consequence, since the animals are then alive, but the timing up to that point in the process should be as expeditious as indicated because of the biological factors involved.

In Figure 8 there is illustrated a modified unit for carrying out the practice of the present invention. This unit comprises a house 160 having tables 161 and 162 therein, an entry area 163 having doors 164 and 165, and an air lock 166 which is filled with an antiseptic solution at 167.

As is the case in the preferred modification of the present invention, the interior of the house 160 is maintained at hospital cleanliness. The personnel working within the house 160 must maintain their persons in a condition of strict cleanliness, and preferably wear breathing masks to prevent the spread of any harmful organisms to the young animals being processed.

In operation, workman III is stationed in the non-aseptic abattoir area 169. He removes the gravid uteruses from female quadrupeds and after removal of each, places them in the lock 166 where they are immersed in the antiseptic solution 167, the outer surface being thereby sterilized. When the workman III places a uterus in the lock 166, he notifies workman IV of that fact by means of any convenient signal. Workman IV then removes the sterilized gravid uterus from the lock 166 and proceeds to remove the young therefrom and individually process them.

He performs the operations as heretofore described on the young animal, places each in the growing box, seals them therein, and deposits the box in a location where it may be removed for transporting to the growing houses. The boxes are removed from the house 160 through the aseptic entry area 163 and loaded onto transporting vehicles.

Figure 8 also illustrates a uterus 170 in successive stages of progress through the modified apparatus, in the hands of workman III, submerged in the antiseptic 167 of lock 166, and on table 161 where workman IV performs the necessary operations on it.

Sterilized growing boxes are provided for the process and are preferably stored in an accessible location for the workman IV, for example, as the box 171 located on table 162. Additional boxes when needed are provided by having an individual bring them in through the entry 163 from the non-aseptic area 169 and having them sterilized before use by proper means located within the house 160.

The following terminology is used throughout the specification and claims:

Immobilized means the immobilization of the animal by anesthetic or other means, such as is described, for example, in Patent No. 2,526,037.

Hysterectomy means the removal of the intact gravid uterus by opening the abdominal cavity and separating the intact gravid uterus from the adjacent tissues.

Contamination means contact between clean or sterile surfaces and germs not normally present thereon.

Uterus or womb has the usual animal definition and is that portion of the female animal's anatomy wherein the young are developed prior to birth.

Gravid uterus means the uterus of the female animal containing young developed to full term or nearly full term and about ready to be born, farrowed or dropped.

Intact, as used with uterus, means that the uterus wall is free from incisions, thus presenting an exterior surface protective of the young therein.

Clean area, as with reference to the space 26, means an area in which conditions of cleanliness equivalent to that found in hospitals is maintained and in which the personnel maintain a level of personal cleanliness substantially equivalent to that found among hospital personnel.

Antiseptic lock means a region through which materials passing are subjected to antiseptic conditions, either liquid or gaseous, so as to reduce the degree of contamination of the materials passing therethrough and of the clean areas, into which such materials are subsequently introduced.

Full term means the requisite length of time for full development of the young animal taken from time of conception to time of birth.

As many apparently widely different embodiments of this invention may be made without departing from the spirit and scope thereof, it is to be understood that I do not limit myself to the specific embodiments herein.

What I claim is:

1. An apparatus for recovering live young from a female quadruped animal and for recovering the meat and other values of such female quadruped animal which comprises an abattoir area, a closed clean house adjacent to said abattoir area, said clean house being completely closed except for access openings therethrough, a first continuous conveyor connecting said abattoir area and the interior of said clean house, said conveyor operating in a conduit having a lock in the wall between said clean house and abattoir area for sterilizing the conveyor and any load therein as it passes through the lock from the abattoir area to the interior of the clean house, a second conveyor operating within said clean house, an access opening to the first conveyor in the abattoir area and another access therefor opening into the clean house.

2. The apparatus of claim 1 further characterized in that that portion of the first conveyor operating from the abattoir area to the interior of the clean house includes a depressed deep tank portion for containing an antiseptic solution, said conveyor and the load carried thereby being completely submerged in said antiseptic as it is carried therethrough.

3. The apparatus of claim 1 further characterized in that the portion of the first conveyor operating between the clean house and the abattoir includes a lock portion including a sterilizing zone.

4. The apparatus of claim 1 further characterized in that said clean house includes a work chamber into which each of the conveyors delivers, the first conveyor delivering from the abattoir area into said work chamber and the second conveyor operating between said work chamber and the interior of said clean house, said work chamber being provided with an air duct delivering into it, means for blowing air into the interior of said work chamber for maintaining it at a pressure slightly in excess of the pressure within the interior of the clean house.

5. The apparatus of claim 4 further characterized in that said work chamber is provided with access openings along the conveyors operating therein through which operators standing at the exterior of said work chamber may reach for performing work operations therethrough.

6. The apparatus of claim 1 further characterized in that said second conveyor has a loading station for loading growing boxes thereon and work stations therealong at which live animals may be treated preparatory to closing the boxes containing said animals.

7. The apparatus of claim 6 further characterized in that said second conveyor includes a run having ultra-violet lamps for exposing growing boxes carried on said second conveyor to the rays of said ultra-violet lamps for sterilizing them.

8. An apparatus for recovering live young from a female quadruped animal and for recovering the meat and other values of such female quadruped animal which comprises in an abattoir area, a closed clean house adjacent to said abattoir area, said clean house being completely closed except for access openings therethrough, a lock in the wall between said clean house and abattoir area adapted to have material moved therethrough, means for sterilizing said material as it is moved through said lock.

9. The apparatus of claim 8 being further characterized in that said lock includes a depressed tank portion for containing an antiseptic solution, said material being completely submerged in said antiseptic as it is moved through said lock.

No references cited.